Figure 1:
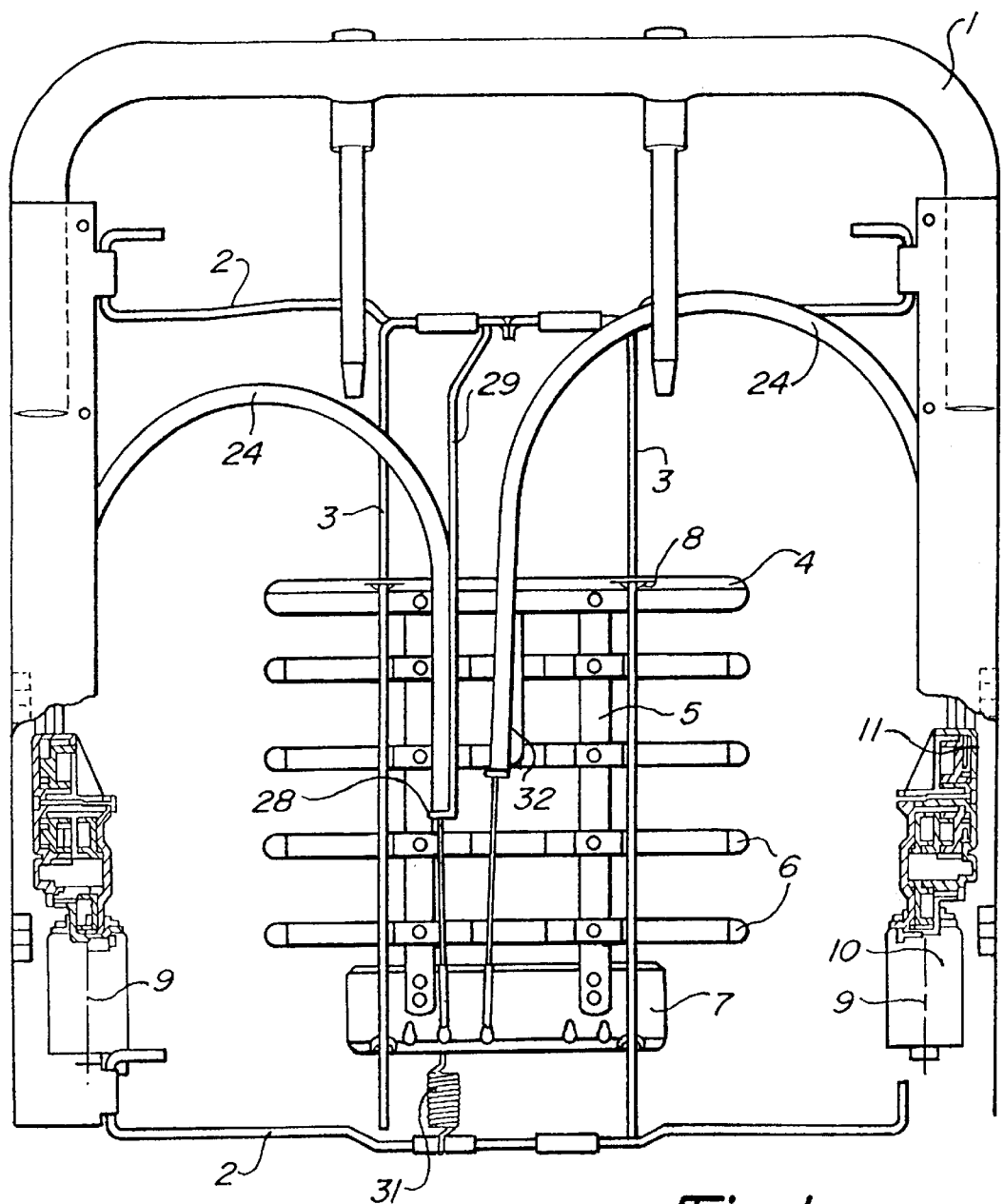

United States Patent

Klingler

Patent Number: 6,158,300
Date of Patent: *Dec. 12, 2000

[54] APPARATUS FOR THE LEVEL ADJUSTMENT AND/OR ARCHING ADJUSTMENT OF A FLEXIBILITY RESILIENT SUPPORT ELEMENT OF A BACK REST OF A SEAT

[75] Inventor: Knud Klingler, Nürnberg, Germany

[73] Assignee: Schukra Geratebau G.m.b.H., Linz Leonding, Austria

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/002,809

[22] Filed: Jan. 5, 1998

Related U.S. Application Data

[63] Continuation of application No. 08/545,602, Oct. 30, 1995, Pat. No. 5,704,687, and a continuation of application No. PCT/EP94/01256, Apr. 22, 1994.

[30] Foreign Application Priority Data

Apr. 30, 1993 [DE] Germany ............................ 43 14 325

[51] Int. Cl.$^7$ ...................................................... G05G 1/04
[52] U.S. Cl. .......................................... 74/526; 297/284.4
[58] Field of Search .......................... 297/284.4; 74/505, 74/526, 89.14

[56] References Cited

U.S. PATENT DOCUMENTS

| | | | |
|---|---|---|---|
| 1,177,265 | 3/1916 | Pavey et al. ........................ | 74/505 X |
| 2,508,186 | 5/1950 | Newell ................................... | 74/505 |
| 2,905,003 | 9/1959 | Meyer et al. ........................ | 74/89.14 |
| 3,110,380 | 11/1963 | Meyer et al. ........................ | 74/506 X |
| 3,220,701 | 11/1965 | Clausen et al. ..................... | 74/505 X |
| 4,316,631 | 2/1982 | Lenz et al. ........................... | 297/284.4 |
| 4,950,032 | 8/1990 | Nagasaka .......................... | 297/284.4 X |
| 5,161,419 | 11/1992 | Moy et al. .......................... | 74/89.14 X |
| 5,182,957 | 2/1993 | Bohmer et al. ..................... | 74/526 X |
| 5,197,780 | 3/1993 | Coughlin ........................... | 297/284.4 X |
| 5,199,310 | 4/1993 | Yoshimura ........................ | 74/505 X |
| 5,217,278 | 6/1993 | Harrison et al. ................... | 297/284.4 X |
| 5,483,849 | 1/1996 | Orii et al. ........................... | 74/505 X |
| 5,960,670 | 10/1999 | Iverson et al. ..................... | 74/526 X |

FOREIGN PATENT DOCUMENTS

| | | | |
|---|---|---|---|
| 0622564 | 11/1994 | European Pat. Off. .............. | 74/89.14 |
| 0057756 | 2/1990 | Japan .................................. | 74/89.14 |
| 5-065949 | 3/1993 | Japan .................................. | 74/89.14 |

*Primary Examiner*—Peter M. Cuomo
*Assistant Examiner*—David E. Allred
*Attorney, Agent, or Firm*—Howard & Howard

[57] ABSTRACT

The invention relates to an apparatus for the level adjustment and/or arching adjustment of a flexibly resilient support element (4) for the lordosic vertebrae of a sitting person, and which is fitted in the fame (1) of a back rest of a seat, each apparatus comprising a gear mechanism (12) including a worm (14), a worm gear (15), a pinion (16) and a tooth element as well as a drive means. According to the invention the gear mechanism is directly connected to the drive means in such a manner that the rigid drive shaft (13) thereof carries the worm (14) engaging into the worm gear (15), the pinion (16) being fixed axially in the work gear (15) in tooth engagement with a gear wheel (17) in a plane parallel to the worm gear (15). The gear wheel (17) being associated with at least one reel (21) to which the one end of the sheathed cable (23) of a Bowden cable assembly (24) is fixed and onto which it can be wound, the gear wheel (17) comprising at least one projection, which coacts with stop surfaces inside the casing (11) of the gear mechanism (12) to limit in a defined manner the movement of the gear wheel (17). Preferably the drive means is an electric motor.

6 Claims, 3 Drawing Sheets

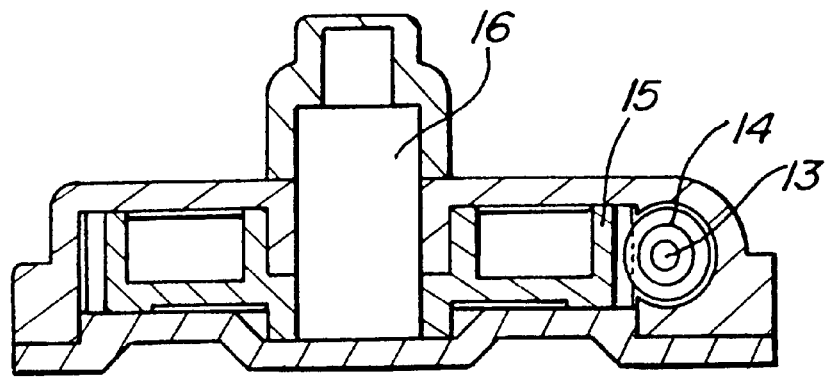
_Fig-3_
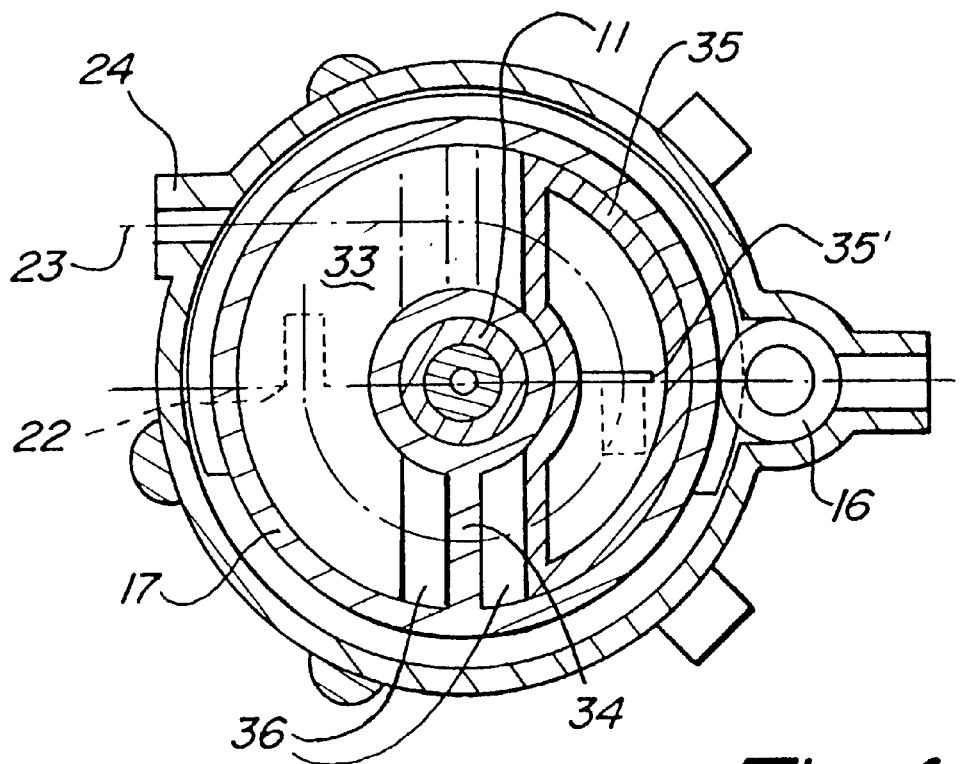
_Fig-4_

APPARATUS FOR THE LEVEL ADJUSTMENT AND/OR ARCHING ADJUSTMENT OF A FLEXIBILITY RESILIENT SUPPORT ELEMENT OF A BACK REST OF A SEAT

This is a continuation of application(s) Ser. No. 08/545,602 filed on Oct. 30, 1995 and issued as U.S. Pat. No. 5,704,687 Jan. 6, 1998. filed on Also con't of International Application PCT/EP94/01256 filed on Apr. 22, 1994 and which designated the U.S.

The invention relates to an apparatus for the level adjustment and/or arching adjustment of a flexibly resilient support element for the lordosic vertebrae of a sitting person and fitted in the frame of a back rest of a seat, each apparatus for level adjustment and/or arching adjustment comprising a gear mechanism including a worm, a worm wheel, a pinion and a tooth element as well as a drive means.

Such an apparatus is known from AT-B-394 829. In that apparatus two electric motors are fitted to the frame, one for the adjustment of the level and the other for the adjustment of the arching of the support element. On the rear of the support element is provided for each motor a gear mechanism including a worm, a worm gear, a pinion and a tooth rack, each being connected to the electric motor by way of a flexible drive shaft, bent about 180°. For level adjustment the tooth rack of the particular gear mechanism is linked to a balancing beam, which in turn by way of rigid spokes is connected to the upper and lower ends of the support element. The gear mechanism attains a high gear ratio which permits the employment of electric motors even of low power for bringing about the adjustments, energy being, however, lost by virtue of the flexible shaft, a high unpleasant noise level being caused and the latter being subject to rapid wear. In addition the construction is extremely complicated and therefor expensive.

It is an object of the invention to so improve an apparatus of the kind set out in the introduction that in spite of a simple construction an adjustment within defined limits is possible in an energy saving manner and without noise generation.

This object is attained by an apparatus for the level adjustment or arching adjustment of a flexibly resilient support element (4) for the lordosic vertebrae of a sitting person, and which is fitted in the frame (1) of a back rest of a seat, said apparatus for level adjustment and/or arching adjustment comprising a gear mechanism (12) including a worm (14), a worm gear (15), a pinion (16), and a tooth element, as well as drive means, characterized in that the gear mechanism is directly connected to the drive means in such a manner that a rigid drive shaft (13) thereof carries the worm (14) engaging into the worm gear (15), the pinion (16) being fixed axially in the worm gear (15) in tooth engagement with a gear wheel (17) in a plane parallel to the worm gear (15), the gear wheel (17) being associated with at lest one reel (21) to which one end of a sheathed cable (23) of a Bowden cable assembly (24) is fixed and onto which it can be wound, the gear wheel (17) comprising a web (34) which coact with stop formations (35) inside a casing (11) of the gear mechanism (12) to limit in a defined manner the movement of the gear wheel (17).

Advantageous embodiments of the invention will be apparent from the subsidiary claims.

Figure 2:
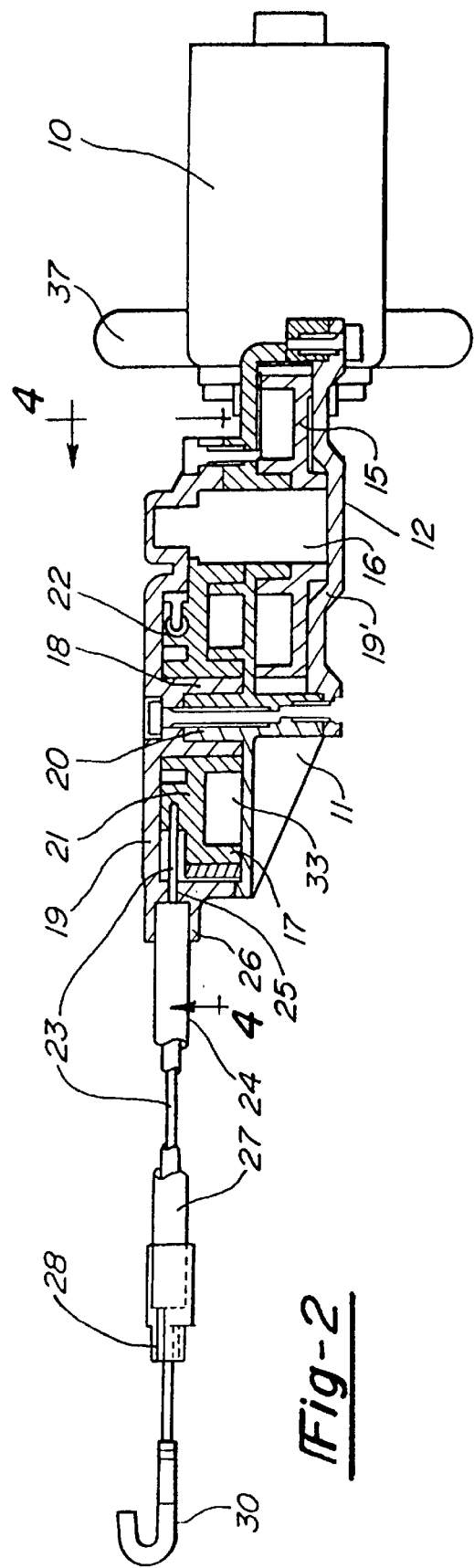

In the following the invention will be further explained by way a working example with reference to the drawings. There is shown in:

FIG. 1 the frame of a back rest including a means for adjusting the level of the support member and and apparatus for adjusting the arching of the seat element;

FIG. 2 an adjustment means in partial longitudinal section;

FIG. 3 a section through the worm, the gear wheel and the pinion of the gear mechanism of an adjustment means;

FIG. 4 a section along the line IV—IV in FIG. 2.

The back rest schematically illustrated in FIG. 1 comprises the frame 1 in which between two transverse struts 2 a guide composed of two rods 3 parallel to one another is provided for a support element 4 which is to be moved up and down the guide.

The support element 4 can, as illustrated in FIG. 1, comprise two resiliently flexible longitudinal strips 5 which are parallel to one another and which are interconnected by spaced apart transverse strips 6. At the upper or lower end of the support element 4 reinforced strips or a reinforcement panel 7 may be provided, preferably connected to sliding element 8 which slide on the rods 3. The support element 4 may be made of optional material, even plastics or sheet metal and combinations thereof in a plurality of parts or in one piece, e.g. be punched out. The support element 4 may also comprise additional support elements, not illustrated, which serve to support the lower back region and are fitted to the support element 4 as separate parts or can be made integrally therewith.

To each of the side beams of the frame 1 an electric motor 9 is fitted, the casing 10 of which is immovably connected to the housing 11 of a gear transmission 12. The electric motor 9 comprises a drive shaft 13 (FIG. 3) on which a worm 14 is mounted, projecting into the gear box 11 and being in engagement with the worm gear 15 provided therein. In the central axis of the worm gear 15 a pinion 16 is mounted irrationally in relation to the worm gear 15. That portion of the pinion 16 which projects beyond the worm gear 15 and beyond the cover portion of the gear box 11 is in tooth engagement with a gear wheel 17 which, in the working example according to FIG. 2, is rotatably mounted on the shaft 18 which defines an axis of rotation A about which rotates gear wheel 17. In the working example the shaft 18 is manufactured integrally with a cover 19 which closes the gear box 11. It stands to reason that the shaft 18 can also form part of the casing 11 or be fitted as a separate part to the cover 19 or the gear box 11. In order to facilitate the assembly the gear box 11 comprises a cylindrical projection 20 which facilitates a centrally aligned application of the cover 19 which comprises an appropriate elongate aperture for accommodating the cylindrical projection 20. The tooth wheel 17 on that side which faces the cover 19, carries a reel 21 which in the working example is manufactured as an integral part of the gear wheel 17. That part of the gear box 11 in which the worm gear 15 with the pinion 16 is fitted is covered by a cover 19' so as to facilitate access thereto. The covers 19, 19' are fitted to the gear box 11 by way of screws in the working example; however, they may also be of different design, e.g. designed as snap closures.

The reel 21 may also be fitted to the gear wheel 17 in a releasable manner, it thereby being made possible to employ reels 21 of different diameters which, as will be explained further below, permits the attainment of variable adjustment ranges. Reels 21 having different diameters may, however, also be interchanged as a single component integrally combined with the gear wheel 17. The reel 21 comprises on its periphery a guide groove and at least one receiving aperture 22 for receiving the enlarged end of a sheathed cable 23 of a Bowden cable arrangement 24. A passage means 25 is provided in the cover 19 which terminates in a receiving sleeve 26 in a projection of the cover 19. The receiving sleeve 26 serves to receive the one end of the sheath 27 of the Bowden cable arrangement 24.

The opposite end of the sheathing 27 is accommodated in a further receiving bush 28 which in the apparatus for the level adjustment of the support element 4 is fitted to the bracket 29 (FIG. 1) which is connected to the transverse strut 2 and is fixed parallel to the rod 3. The free end of the sheathed cable 23 passing through the receiving bush 28 terminates, according to the exemplified embodiment, in a hook 30 (FIG. 2), hooked into the lower reinforcement panel 7 of the support element 4. Between the reinforcement panel 7 and the lower transverse strut 2 of the frame 1 a return spring 31 is suspended, it also being possible for a plurality of springs being provided to draw the support element 4 towards the lower transverse strut 2. Constructions are also feasable in which the support element is downwardly drawn by the Bowden cable arrangement and is pushed upwardly by the springs (not illustrated).

In the apparatus for adjusting the arching of the support element 4 the second receiving bush 28 for the sheathing 27 of the Bowden cable arrangement 24 is fixed in the upper region of the support element 4, optionally by way of an extension 32. The one sheathed cable 23 is hooked by means of its hook 30 to the lower edge of the reinforcement panel 7.

The gear wheel 17 comprises a circular groove 33 starting from it underside. A projection, which in the working example is designed as a web 34 (FIG. 4), projects into the groove 33. The web 34 is fitted on both sides with a buffer 36 of optional suitable material, e.g. rubber. In the region of the groove 33 a stop member 35 the stop surfaces of which may be close together or at a certain distance from one another, see the stops 35, 35' in FIG. 4, is provided in the gear box 11. The stop may be used to adjust the winding range for the sheathed cable 23 onto the reel 21 at will up to almost 360°. One position of the sheathed cable 23, although positioned in a different plane, is shown in dash-dotted lines in FIG. 4.

By the arrangement and design of the stop 35, 35' or its stop surfaces as well as the size of the diameter of the reel 21 the winding range and thereby the displacement range can be adapted to the particular desired length, according to the desired magnitude of the level adjustment or arching adjustment. An additional possibility for adjustment will exist if one or both receiving brushes 26, 28 are fitted adjustably, e.g. by screwing.

Instead of one or a plurality of return springs 31 in the apparatus for level adjustment it is also possible to provide a second identical level adjustment means which, although being somewhat more expensive, offers the advantage that the restoring forces of the spring(s) 31 need not be compensated for.

Instead of an electric motor 9 it is also possible for a handle, e.g. a hand reel 37 (indicated in FIG. 2) or a lever to be fitted to the drive shaft 13, optionally connected to a ratchet means which, where applicable, may be fitted with a releasable ratchet pawl.

By way of example a gear ratio for the above described gear transmission 12 may be provided between the worm 14 and the worm gear 15 of 1:90 in the first stage (plane) and between the pinion 16 and the gear wheel 17 of 1:6 in the second stage (plane), amounting to an overall ration of 1:540, from which it will be clear that only a minor energy exertion is needed for adjusting both the level as well as the arching of a support element, where in each case a maximum extent of adjustment is prescribed in a defined manner by the stops 35, 35', so as to present damage to the support element 4 and other components of the apparatus by exercising adjustment forces which are to high, e.g. when adjusting manually.

What is claimed is:

1. An apparatus for adjustment of a lumbar support for a seat comprising:

a casing having stop formations; and a control mechanism including a cable mechanism attached to a rotatable element located within said casing, said rotatable element including a gear wheel and a reel located axially adjacent to each other and rotatably supported about a common axis, said gear wheel having an outer edge defining a periphery and a web extending radially from said common axis to said periphery, said stop formations fixedly located within an area defined by said periphery such that a displacement of said cable mechanism is limited by abutment of said web with said stop formations.

2. The apparatus according to claim 1 wherein said rotatable element includes a gear wheel and a replaceable reel, said replaceable reel releasably attached to said gear wheel, said gear wheel acting against said stop formations while said replaceable reel receives said cable mechanism.

3. The apparatus according to claim 2 wherein said reel is integral to said gear wheel.

4. The apparatus according to claim 1 wherein said casing includes a removable casing portion, said removable casing portion including said stop formations.

5. An apparatus for the adjustment of a flexibly resilient element of a seat backrest comprising:

a casing including a replaceable casing portion having an arcuate stop;

a gear wheel having a radial outer edge defining a periphery rotatable about an axis and having a substantial open area between said periphery and said axis, said gear wheel including a web extending radially from said axis to said periphery, said arcuate stop fixedly retained on said casing and positioned within said open area of said gear wheel or said casing and positioned to define rotational limits of said gear wheel; and a control mechanism including a Bowden cable mechanism, said Bowden cable mechanism axially adjacent and connected to said gear wheel, wherein displacement of said cable mechanism is limited by contact of said web with said stop.

6. An apparatus for adjustment of a lumbar device in a seat comprising:

an outer member including a replaceable outer member poriton having stop formations;

a control mechanism for said lumbar device including a gear wheel and a reel located about a common axis with said reel releasably attached to said gear wheel, said gear wheel having an outer edge defining a periphery and including a web extending radially from said common axis to said periphery, said stop formations located about said common axis and within said gear wheel periphery, said stop formations defining rotational limits of said gear wheel to a predefined rotational distance; and a cable mechanism windingly receivable by said reel wherein displacement of said cable mechanism is limited by rotation of said web between said stop formations.

* * * * *